United States Patent
Agnihotri et al.

(10) Patent No.: US 10,421,531 B2
(45) Date of Patent: Sep. 24, 2019

(54) LAPTOP BASED RAPID CONTROL LAWS DEVELOPMENT

(71) Applicant: BELL HELICOPTER TEXTRON INC., Fort Worth, TX (US)

(72) Inventors: Ashok K. Agnihotri, Southlake, TX (US); Thomas W. Brooks, Hurst, TX (US)

(*) Notice: Subject to any disclaimer, the term of this patent is extended or adjusted under 35 U.S.C. 154(b) by 43 days.

(21) Appl. No.: 13/685,758

(22) Filed: Nov. 27, 2012

(65) Prior Publication Data
US 2014/0148977 A1   May 29, 2014

(51) Int. Cl.
| | | |
|---|---|---|
| *B64C 13/00* | (2006.01) | |
| *B64C 27/56* | (2006.01) | |
| *B64C 13/04* | (2006.01) | |
| *G05B 19/042* | (2006.01) | |
| *G05D 1/08* | (2006.01) | |

(52) U.S. Cl.
CPC ...... *B64C 13/0421* (2018.01); *G05B 19/0426* (2013.01); *G05D 1/0833* (2013.01)

(58) Field of Classification Search
CPC ......... B64C 13/04; B64C 13/00; B64C 27/56; G05B 19/416; G05B 23/0256; G05B 19/0426; B64F 5/0045; G05D 1/0833; F16D 2500/70605
USPC ....................................................... 701/3, 17
See application file for complete search history.

(56) References Cited

U.S. PATENT DOCUMENTS

| | | | |
|---|---|---|---|
| 6,401,013 B1 * | 6/2002 | McElreath | G01C 23/005 244/1 R |
| 8,321,083 B2 * | 11/2012 | Beebe et al. | 701/29.1 |
| 8,374,737 B2 * | 2/2013 | Takacs et al. | 701/17 |
| 2006/0200278 A1 | 9/2006 | Feintuch | |
| 2007/0033195 A1 * | 2/2007 | Stange | G05B 23/0213 |
| 2007/0198126 A1 * | 8/2007 | Black | G05D 1/0055 700/200 |
| 2007/0252046 A1 * | 11/2007 | Miller | G05B 19/416 244/221 |
| 2008/0097658 A1 * | 4/2008 | Shue | G05D 1/101 701/8 |
| 2012/0042324 A1 | 2/2012 | Breker et al. | |
| 2013/0261853 A1 * | 10/2013 | Shue | B64C 19/00 701/3 |

FOREIGN PATENT DOCUMENTS

EP     2520989     11/2012

OTHER PUBLICATIONS

European Search Report dated Nov. 15, 2013 from counterpart EP App. No. 13151747.7.

(Continued)

*Primary Examiner* — Christian Chace
*Assistant Examiner* — Aaron C Smith
(74) *Attorney, Agent, or Firm* — James E. Walton

(57) ABSTRACT

A system and method to modify a qualified actuator command with an unqualified actuator command modifier. The method includes creating a modified actuator command as the difference between the qualified actuator command and the unqualified actuator command and thereafter limiting the modified actuator command with an authority limiter. The system includes a qualified computer having an unqualified control law interfaced with an unqualified computer having a qualified control law.

5 Claims, 3 Drawing Sheets

(56) References Cited

OTHER PUBLICATIONS

Mark Schwabacher, Pre-Launch Diagnostics for Launch Vehicles, 2008 IEEE Aerospace Conference, Mar. 8, 2008, ISBN: 978-1-4244-1487-1.
Office Action dated Oct. 8, 2015 from counterpart CA App. No. 2,831,311.
Canadian Office Action dated May 12, 2017 from counterpart CA App. No. 2,831,311.
Canadian Office Action dated Feb. 26, 2018 from counterpart CA App. No. 2,831,311.
Canadian Office Action dated Dec. 4, 2018 from counterpart CA Appl. No. 2,831,311.
European Search Report dated Apr. 7, 2015 from counterpart EP App. No. 13151747.7.
Canadian Office Action dated Apr. 1, 2015 from counterpart CA App. No. 2,831,311.
Canadian Office Action dated Jun. 29, 2016 from counterpart CA App. No. 2,831,311.

* cited by examiner

LAPTOP BASED RAPID CONTROL LAWS DEVELOPMENT

BACKGROUND

1. Field of the Invention

The present application relates generally to flight control laws, and more specifically, to a system for rapid control law development.

2. Description of Related Art

Fly-by-wire (FBW) systems are well known in the art for effectively controlling aircraft maneuverability during flight. The FBW system replaces conventional manual flight controls with an electronic interface configured to convert an electronic signal to a flight control computer, which in turn commands one or more aircraft actuators.

Conventional FBW systems typically include a plurality of control laws that control flight maneuverability such as yaw, pitch, and roll based upon, for example, the current flight conditions, actuator inputs, and the aircraft structural limitations.

FIG. 1 depicts a conventional FBW system 101 having a flight control computer 103 operably associated with one or more sensors 105 and actuators 107. Input commands from actuator 109 are sensed with senor 105, which in turn are relayed to the flight control computer 103. The signals are received by one or more qualified control laws 110 which are then sent to actuators 107.

It should be understood that the FBW control laws are programmed in the control system software architecture and are subject to strict Federal Aviation Administration (FAA) requirements. The FAA has adopted the RTCA/DO-178B guidelines, titled "Software Considerations in Airborne Systems and Equipment Certification," as the certification standard for aviation software. Any safety-critical component in a FBW system including applications of the laws of aeronautics and computer operating systems must be certified under DO-178B Level A, which is applicable for preventing potential catastrophic failures. It should noted that the system, computer, control laws, and software associated therewith are considered "qualified" after undergoing the certification process.

A problem commonly associated with conventional FBW systems is the need to modify the qualified control law architecture after undergoing FAA verification and certification. Changes to the control law architecture must be recertified under FAA guidelines. It should be noted this process is very time consuming; reaching up to six months or more prior to approval.

Another common problem exists after continuous use of the aircraft or when changes are made to the aircraft structure that affects the flight performance. These changes require further adjusting of the control laws to achieve optimal flight performance, which currently require extensive time and effort to received FAA approval.

Although the foregoing developments in FBW technology represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
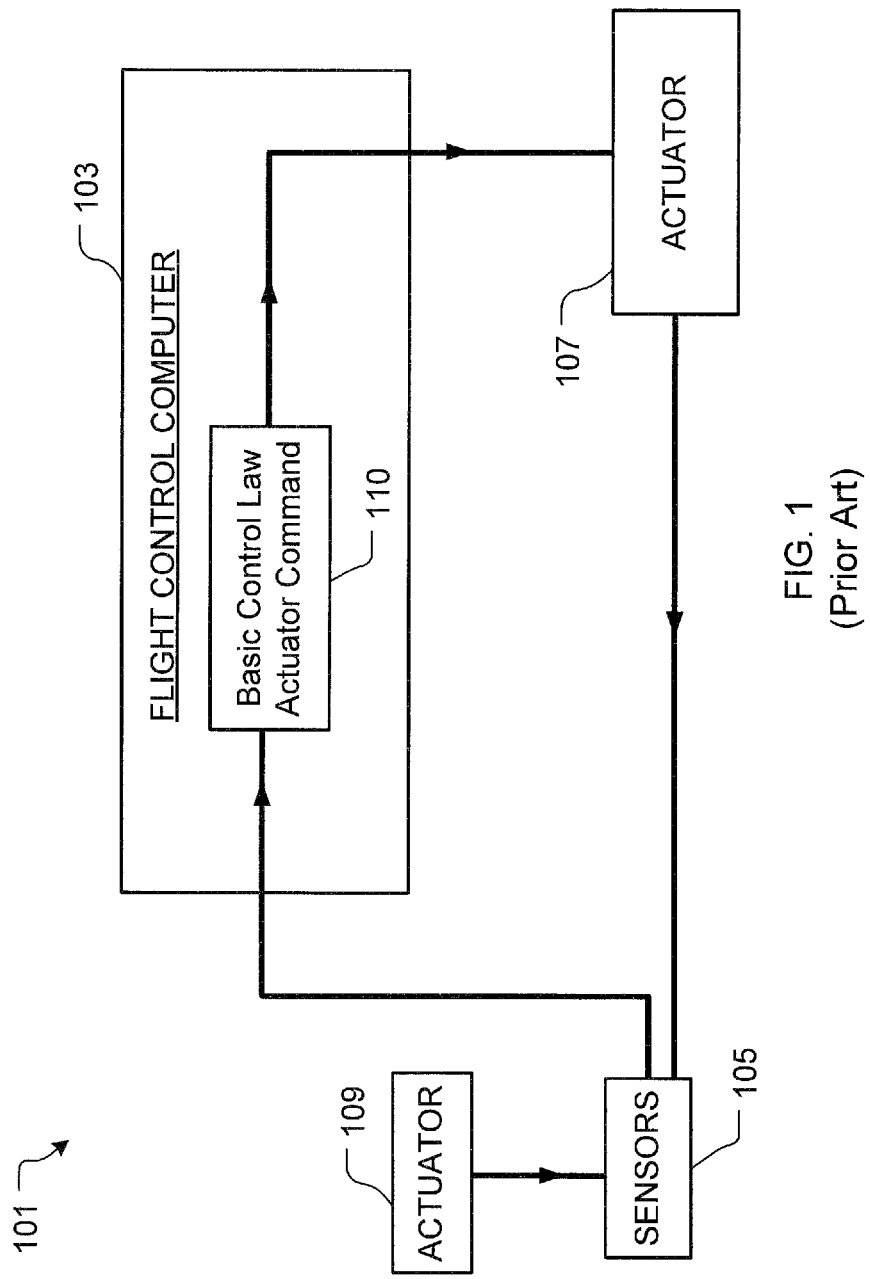
FIG. 1 is a schematic of a conventional FBW control system.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The FBW system and method of the present application overcome the above-listed problems commonly associated with conventional FBW systems. Specifically, the FBW system of the present application provides easily and rapid changes to the qualified control laws without violating FAA DO-178B Level A requirements; a feature currently not being implemented and is highly desirable. This feature is preferably achieved via an external unqualified computer that interfaces with the FBW system for real-time adjustment. The external computer is provided limited authority so as to adjust a percentage of the control law, thus allowing fine-tuning the control law after the FAA verification and certification process. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
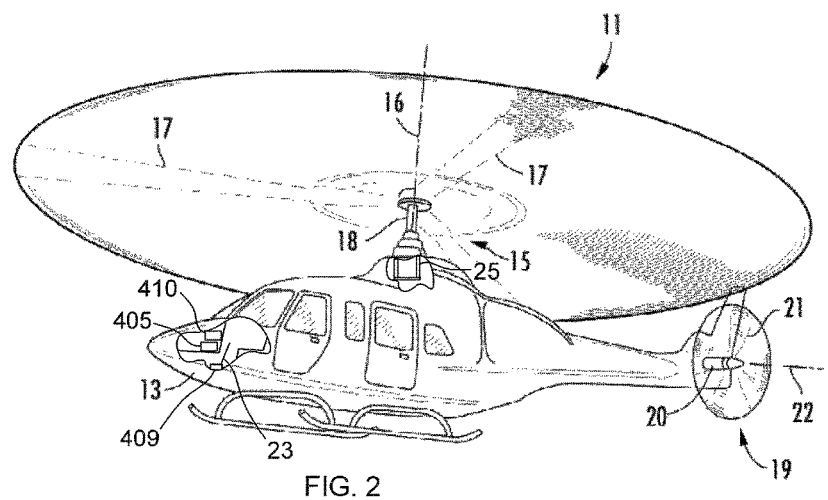
FIG. 2 is a perspective view of a helicopter according to the present application.

Referring now to the drawings wherein like reference characters identify corresponding or similar elements throughout the several views, FIG. 2 shows a helicopter 11 according to a preferred embodiment of the present application. Helicopter 11 comprises a fuselage 13 and a main rotor system 15 having main rotor blades 17 and a main rotor shaft 18. Helicopter 11 also includes a tail rotor system 19 with tail rotor blades 21 and a tail rotor shaft 20. Main rotor blades 17 generally rotate about a vertical axis 16 of main rotor shaft 18, while tail rotor blades 21 generally rotate about a lateral axis 22 of tail rotor shaft 20.

Figure 3:
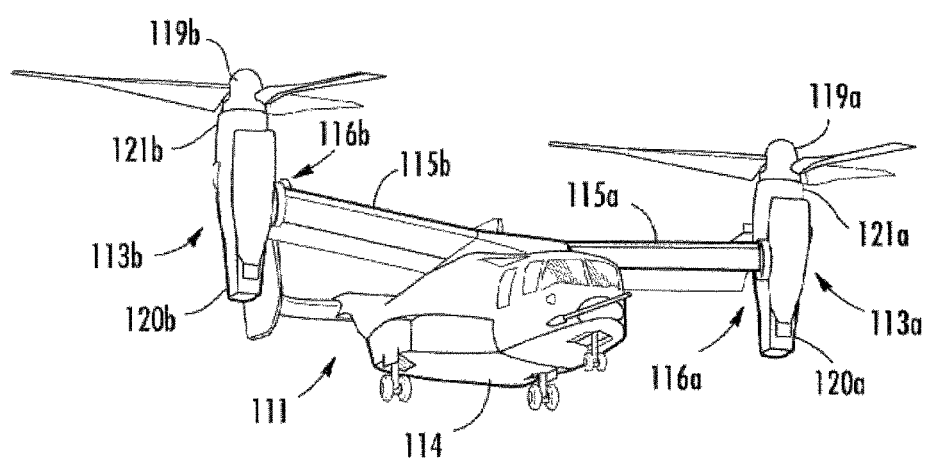
FIG. 3 is a perspective view of a tilt rotor aircraft according to the present application.

Although shown associated with a helicopter, it will be appreciated that system 401 may also be utilized with different types of aircraft or vehicles that utilize FBW or other similar systems subject to regulations. For example, FIG. 3 illustrates a tiltrotor aircraft 111 that utilizes a FBW system in accordance with the present application.

As is conventional with tiltrotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively. Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft.

Figure 4:
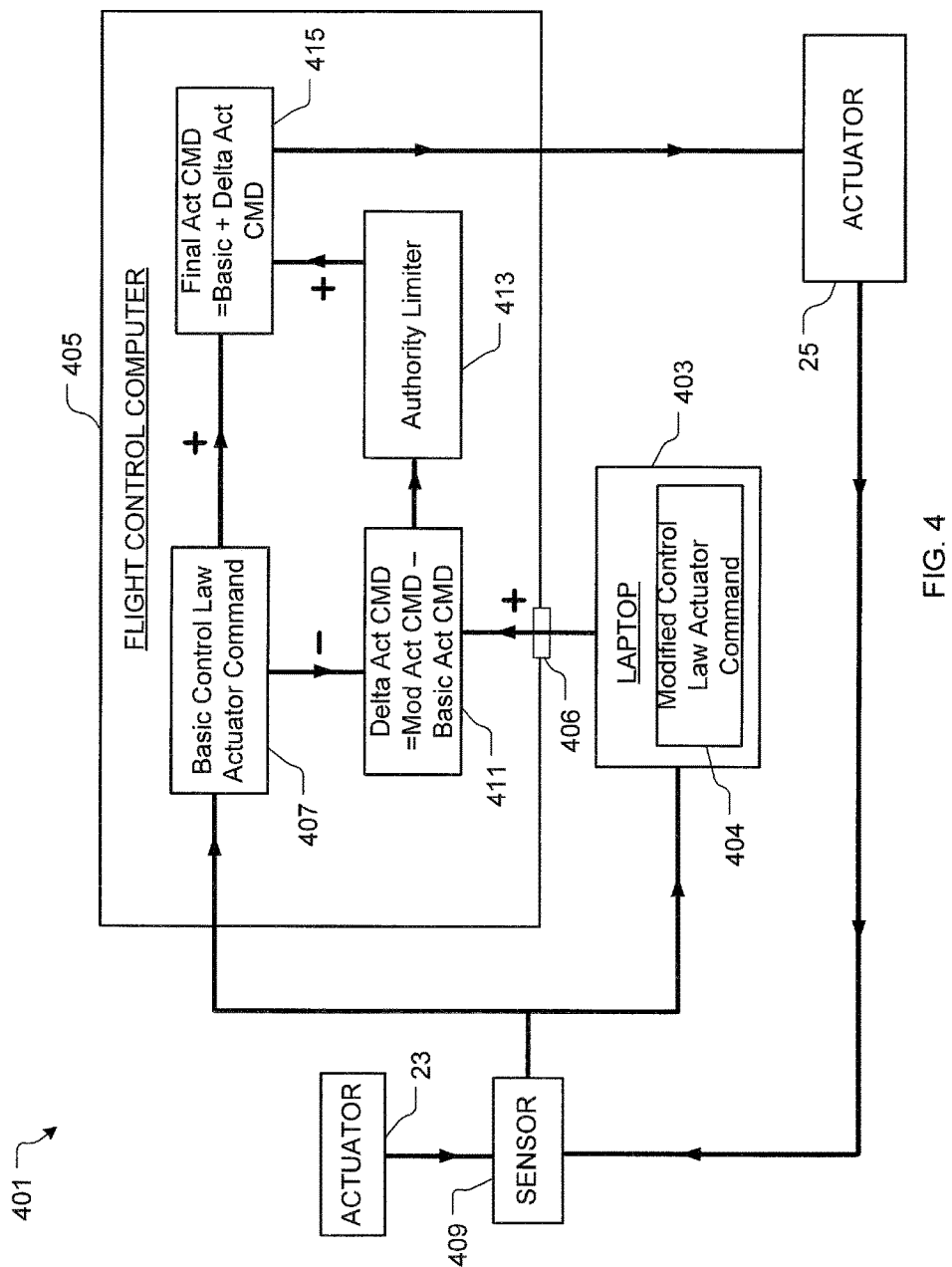
FIG. 4 is a schematic view of a FBW control system according to a preferred embodiment of the present application.

Referring now to FIG. 4, a FBW control system 401 according to a preferred embodiment of the present application is shown. It will be appreciated that system 401 overcomes at least one of the above-listed problems commonly associated with FBW systems subject to FAA requirements.

One unique feature believed characteristic of system 401 is preferably utilizing a portable unqualified computer 403 configured to have limited authority control of the qualified control laws associated with FBW system 401. In the preferred embodiment, computer 403 interfaces with the qualified control computer 405 and is configured to modify one or more of the qualified control laws 407 disposed within the software architecture. During use, the operator interfaces computer 403 with computer 405 and makes changes to the control laws in real-time, which can be done prior to or during flight. It should be understood that the control laws and associated software architecture of computer 403 is considered "unqualified," meaning software that has not undergone FAA level A certification.

In the contemplated embodiment, computer 405 includes a port 406 that allows interfacing with computer 403. In the preferred embodiment, interfacing is achieved via an Ethernet port; however, it will be appreciated that other interfacing means, e.g., wireless means, are also contemplated in alternative embodiments.

System 401 utilizes a plurality of input sensor 409 operably associated with one or more actuators and/or other flight control devices either manually controlled by the pilot and/or autonomously controlled by an aircraft computer 410. In the exemplary embodiment, a stick actuator 23 (see, FIG. 2) is shown as a manual actuator controlled by the pilot and operably associated with sensor 409. Sensor 409 is also shown operably associated with actuator 25, which in the exemplary embodiment is an actuator for manipulating the rotor system. In the contemplated embodiment, sensor 409 is configured to determine the movement of the actuators and relayed the sensed data as a signal to both the qualified computer 405 and unqualified computer 403.

The input signal from sensor 409 is received by the qualified control laws 407, labeled as "Basic Control Law Actuator Command" or "Basic Act CMD," prior to being sent to one or more actuators 25. The input signal is also sent to computer 403, where the signal is analyzed, and thereafter used to create an actuator command modifier, labeled "Mod Act CMD."

A box 411 illustrates the process for creating a delta actuator command "Delta Act CMD," which is the difference of the modified control law actuator command from the unqualified control law 404 and the qualified control law actuator command from control law 407. The Delta Act CMD thereafter is limited by an authority limiter 413 to limit Delta Act CMD values.

Another unique feature believed characteristic of system 401 is determining Delta Act CMD in conjunction with the authority limiter. Specifically, it should be understood that the Mod Act CMD is considered "unqualified," meaning, non-compliant under FAA DO-178B Level A requirements; however, undergoing the process of determining a Delta Act CMD within a predetermined percentage, then thereafter subjecting the Delta Act CMD to authority limits allows modification of phase and gains of the basic control law.

A box 415 illustrates the final actuator command "Final Act CMD," which is the output signal to command actuator 25. As depicted, the Final Act CMD is the added value of the Basic Act CMD from the control law 407 and the Delta Act CMD. It should be noted that the Final Act CMD sends is the command sent to actuator 25.

In a preferred embodiment, the following method is utilized to modify the qualified control law command: first, a qualified actuator command is created with a qualified control law 407; second, an unqualified actuator command modifier is created with an unqualified control law 404 from computer 403; third, a modified actuator command is created as the difference between the qualified actuator command and the unqualified actuator command; and finally, the modified actuator command is limited with an authority limiter 413.

In another preferred embodiment, the following method is utilized to modify the qualified control law command: first, interfacing an unqualified computer 403 having an unqualified control law 404 with a qualified computer 405 having a qualified control law 407; and second, modifying a qualified command created by the qualified control law 407 with an unqualified command modifier created by the unqualified control law 404.

System 401 is configured to determine optimal flight conditions of the aircraft and modify the flight control laws accordingly to achieve these desired flight characteristics. It should be understood that system 401 thus allows real-time adjustments of the flight control laws without the need to reconfigure and thereafter receive FAA approval for each subsequent change. This feature is achieved by making modifications of the control laws "Delta Act CMD" not more than a determined percentage of the complete range of control demand and then thereafter subjected the modification to a limit authority. Thus, it will be appreciated that the modifications to the control laws does not violate FAA DO-178B Level A requirements, which in turn enables real-time changes without the need to exhaust considerable time and effort obtaining FAA approval. This feature is also achieved by receiving a range of preapproved FAA control law limits and adjusting the control law within these limits.

In the illustrative embodiment, system 401 is shown operably associated with a pilot stick actuator 23 and an actuator 25 for operating the rotor system. However, it should be appreciated that system 401 can be operably associated with these and other sensors and actuators of helicopter 11, tiltrotor 111, and other vehicles having control laws subject to regulations. In addition, it will be appreciated that system 401 can be utilized in conjunction with autonomous controls of the aircraft in lieu of manual actuators as shown in the illustrative embodiments.

Although particular step sequences are shown, described, and claimed, it should be understood that steps may be performed in any order, separated or combined unless otherwise indicated and will still benefit from the present disclosure.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to modify flight control laws associated with a flight control computer with a portable computer during flight, comprising:
   certifying the flight control computer to be qualified;
   receiving a range of control law limits in an authority limiter;
   creating a qualified actuator command with a qualified control law with the flight control computer;
   creating an unqualified actuator command with an unqualified control law with the portable computer;
   creating a delta actuator command as the mathematical difference between the qualified actuator command and the unqualified actuator command;
   limiting the delta actuator command with the authority limiter based upon the range of control law limits;
   creating a final actuator command as the mathematical sum of the delta actuator command and the qualified actuator command;
   commanding a commanded actuator with the final actuator command;
   sensing movement of the commanded actuator with a first displacement sensor;
   sensing movement of a pilot controlled actuator with a second displacement sensor; and
   relaying the movement of the pilot controlled actuator to the portable computer.

2. A system, comprising:
   a flight control computer having:
      a qualified control law configured to create a qualified command to an actuator;
      an authority limiter having a range of control law limits; and
   a portable computer having:
      an unqualified control law configured to create an unqualified command;
   wherein the flight control computer is qualified;
   wherein the portable computer is unqualified;
   wherein the flight control computer generates a delta command as the mathematical difference between the qualified command and the unqualified command, the authority limiter limiting the delta command value to within the range of control law limits,
   wherein the flight control computer communicates with the portable computer such that a final command is created with the qualified command mathematically added to the delta command; and
   wherein the actuator is commanded by the final command; and a sensor operably associated with the actuator;
   wherein the sensor senses movement of the actuator.

3. The system of claim 1, the flight control computer further comprising:
   a port for detachably interfacing with the portable computer.

4. The system of claim 1, wherein the sensor is in data communication with the flight control computer and the portable computer.

5. The system of claim 1, wherein the portable computer is portable and detachably interfaced with the flight control computer.

* * * * *